Patented Nov. 3, 1925.

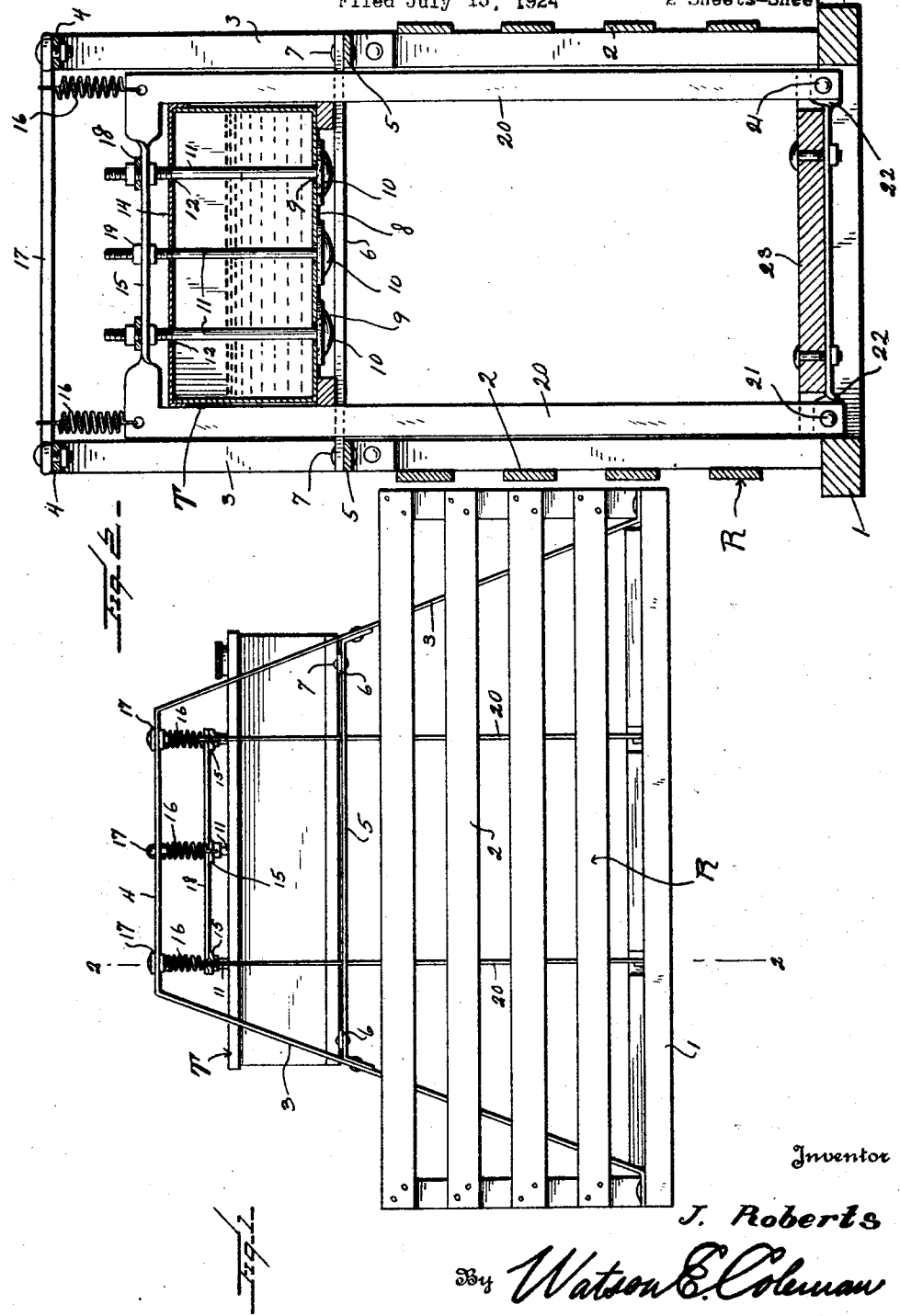

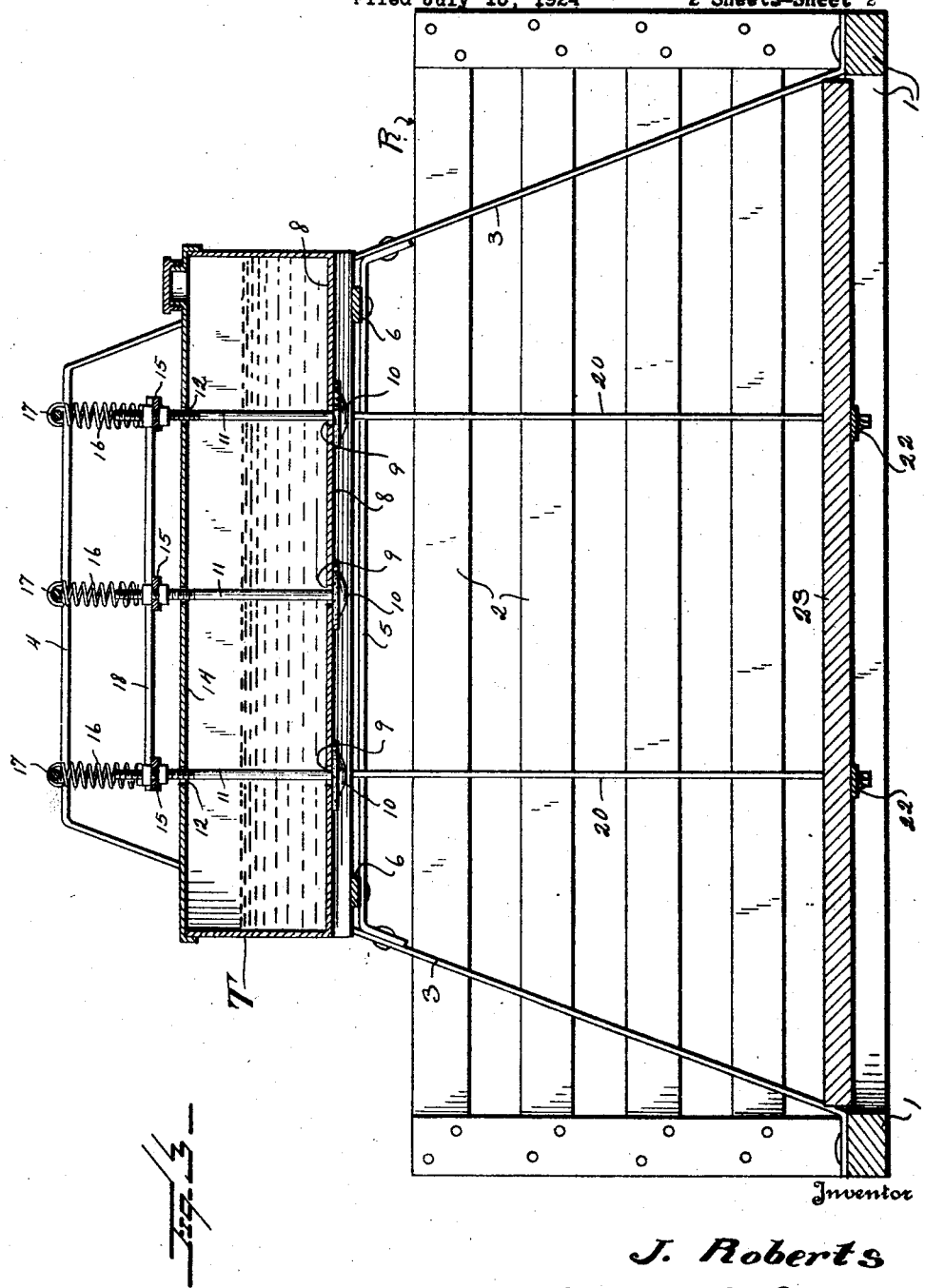

1,559,781

UNITED STATES PATENT OFFICE.

JOHN ROBERTS, OF WISNER, NEBRASKA.

HOG OILER.

Application filed July 15, 1924. Serial No. 726,193.

*To all whom it may concern:*

Be it known that I, JOHN ROBERTS, a citizen of the United States, residing at Wisner, in the county of Cuming and State of Nebraska, have invented certain new and useful Improvements in Hog Oilers, of which the following is a specification, reference being had to the accompanying drawings.

This invention relates to certain improvements in hog oilers, and it is an object of the invention to provide a novel and improved device of this general character embodying a spraying medium together with means operating under the influence of a hog or other stock passing under such spraying medium.

Furthermore it is an object of the invention to provide a novel and improved device of this general character comprising a supply tank supported at a desired elevation and beneath which a hog or other stock is adapted to pass, said tank being provided with discharge openings normally closed by valves associated with said openings whereby means operating under the weight of the hog or other stock passing under the tank moves said valves into open position to permit the oil within the tank to be sprayed upon the animal.

The invention consists in the details of construction and in the combination and arrangement of the several parts of my improved hog oiler whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a view in side elevation illustrating a hog oiler constructed in accordance with an embodiment of my invention;

Figure 2 is an enlarged sectional view taken substantially on the line 2—2 of Figure 1;

Figure 3 is an enlarged vertical sectional view taken longitudinally of the structure as illustrated in Figure 1.

As disclosed in the accompanying drawings, my improved oiler comprises a runway R consisting of the side and end sills 1 and the slotted side walls 2 supported by the side sills 1. However, I do not wish to limit myself to any particular type of runway R except being open at its opposite ends whereby a hog or other stock is caused to travel therethrough in a defined path of travel.

Secured to the extremities of the end sills 1 and extending upwardly and inwardly on predetermined inclines are the supporting members 3 preferably metallic and which have their upper end portions connected by the intermediate members 4 substantially horizontally disposed. Each side pair of members 3 at a predetermined distance below the upper connecting member 4 has interposed therebetween and secured thereto the member 5 also preferably metallic.

The opposite end portions of the members 5 are connected by the cross members 6 resting thereon from above and secured thereto, as at 7, by rivets or the like. The members 6 provide supports for the tank T of desired capacity and herein disclosed as relatively long.

At predetermined points spaced longitudinally thereof the bottom wall 8 of the tank T is provided with the series 9 of transversely spaced discharge openings the flow through each of said openings being under control of a valve 10 positioned below the bottom wall 8.

Each of the valves 10 is carried by the lower end portion of a rod 11 freely disposed through an opening 9 and also through an opening 12 in the top wall 14 of the tank T. The rods 11 of the transverse series of valves 10 have their upper extremities secured to a cross member or bar 15 whereby said valves 10 are caused to operate in unison and in the same general direction. The opposite end portions of each of the cross members or bars 15 have engaged therewith the retractile coiled springs 16 also secured to the transverse bars 17 connecting the intermediate members 4. These springs 16 serve to constantly urge the valves 10 upwardly and maintain the same in closed position.

The cross members or bars 15 are also connected adjacent their end portions by the longitudinally disposed bars or members 18.

Each of the rods 11 is freely disposed through its associated member or bar 15 and threaded on said bar are the nuts 19 coacting with the opposite faces of such member or bar whereby means are provided to effect such adjustment of a valve 10 with respect to the bottom wall 8 of the tank T as may be required.

The end members or bars 18 have their extremities provided with the depending substantially rigid or metallic straps 20 of a length to terminate in close proximity to the side sills 1 and the lower end portions of said straps 20 are connected, as at 21, with the outstanding members or lugs 22 carried by the platform 23, said platform 23 constituting the floor of the runway R and being normally maintained in a raised position by the springs 16 hereinbefore referred to.

In practice, the runway R is positioned immediately adjacent to a gateway or the like so that a hog or the like will be caused to travel over the runway. The weight of the animal imposed upon the platform 23 will depress said platform and thereby move the valves 10 into open position so that the oil or the like within the tank T will be effectively sprayed upon the animal as it passes beneath the tank. By having the valves 10 of a flat type an effective spraying of the oil or the like is assured.

From the foregoing description it is thought to be obvious that a hog oiler constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

A hog oiler comprising a runway, a depressible floor for said runway, a tank positioned above the floor of the runway and provided in its bottom with a plurality of longitudinally spaced discharge openings, rods freely disposed through said openings and extending above the tank, valves carried by the lower portions of the rods for closing the discharge openings, and means whereby the longitudinally spaced valves are successively opened upon depression of said floor in a rocking movement, said means comprising upstanding members carried by the floor and extending above the tank at opposite sides thereof, cross members operatively engaged with said upstanding members, means for connecting the upper portions of the rods to said cross members, and longitudinally spaced retractile hangers for the upstanding members normally maintaining the floor in raised position and the valves normally in closed position with respect to the discharge openings in the bottom of the tank.

In testimony whereof I hereunto affix my signature.

JOHN ROBERTS.